Feb. 2, 1971 R. W. SMITH 3,560,312
ORBITAL PRESSURE APPLYING APPARATUS FOR TRAVELING WEBS
Filed Aug. 7, 1968 3 Sheets-Sheet 1

INVENTOR
Richard W. Smith
BY
Mosell & Mosell
ATTORNEYS

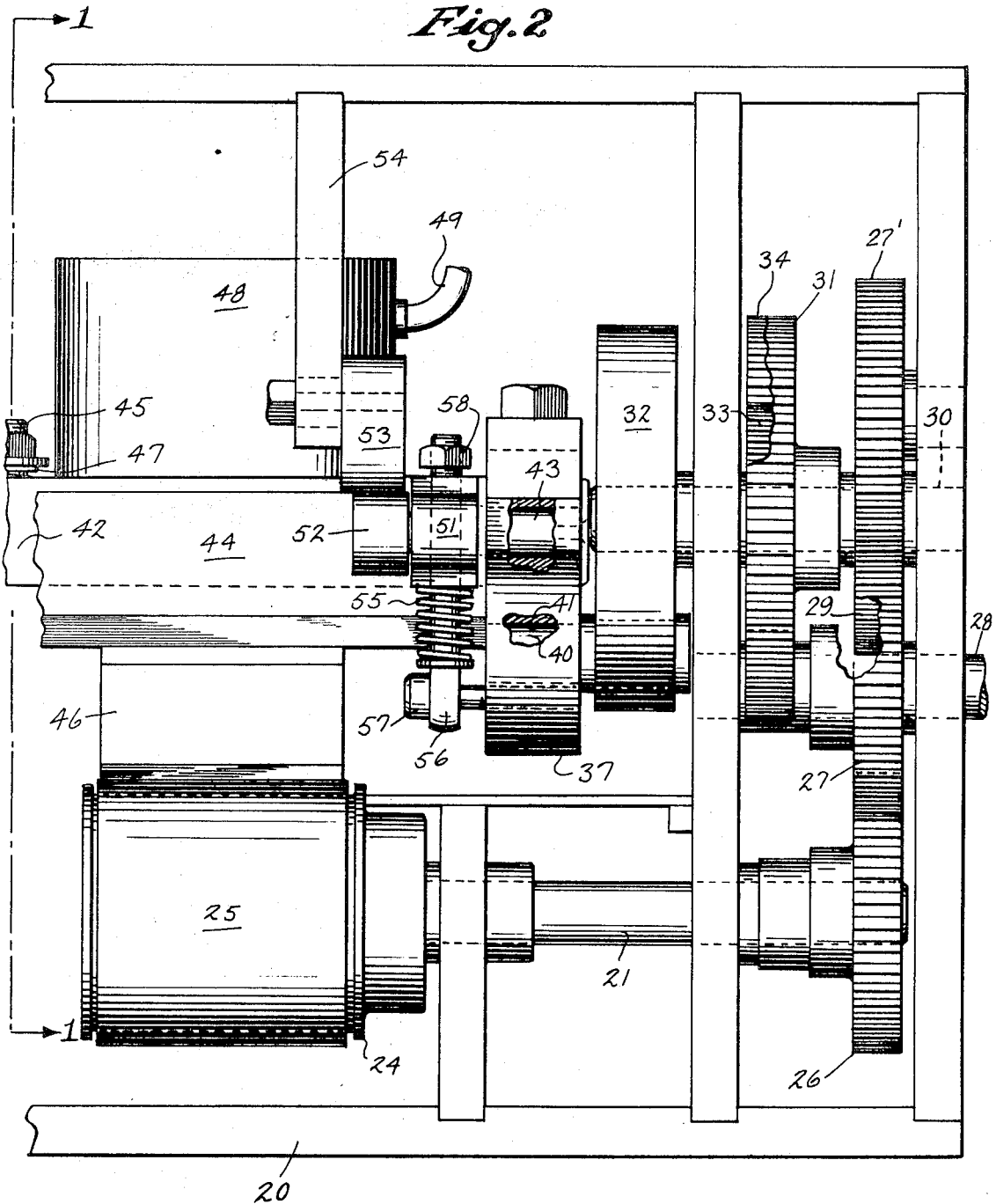

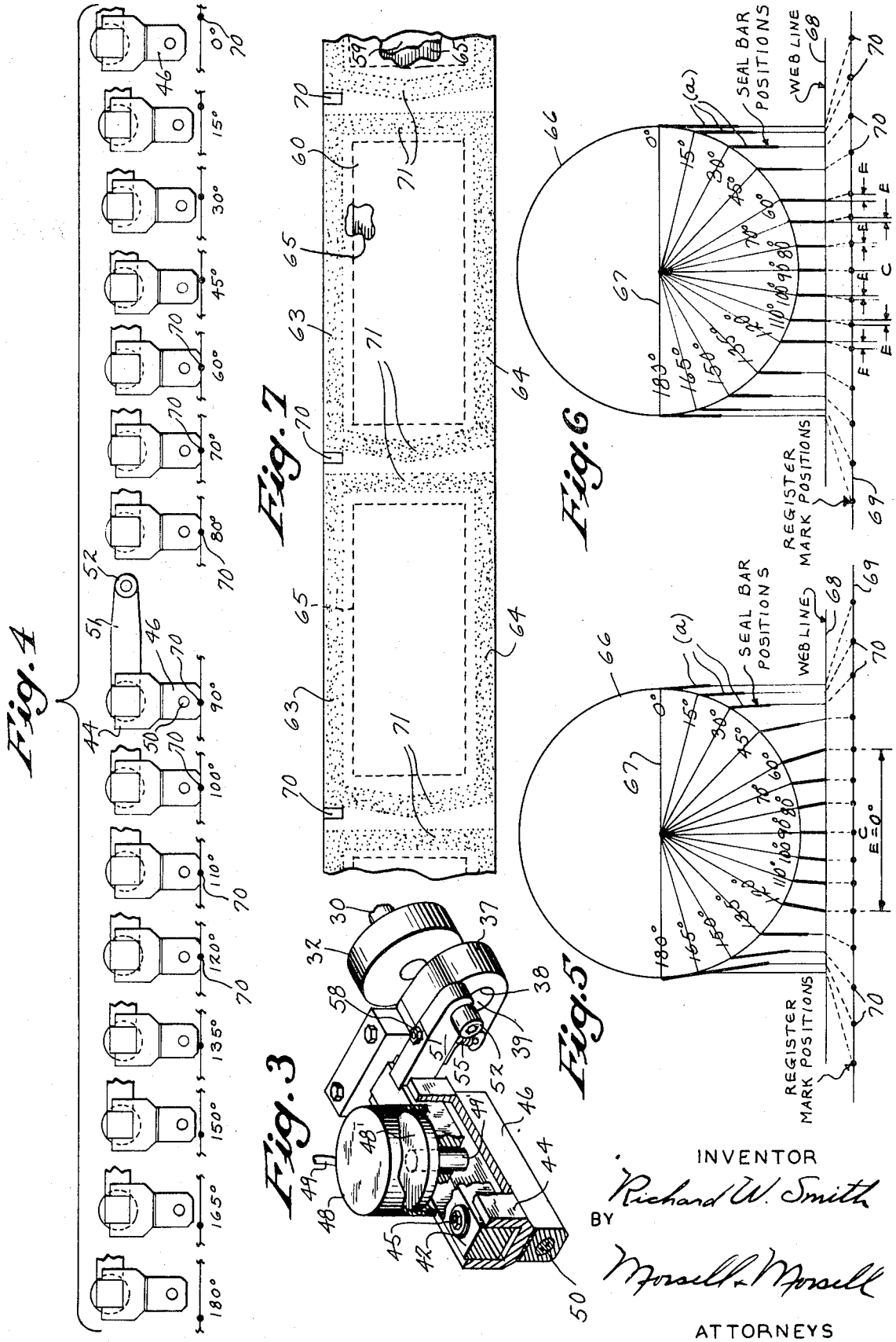

United States Patent Office 3,560,312
Patented Feb. 2, 1971

3,560,312
ORBITAL PRESSURE APPLYING APPARATUS
FOR TRAVELING WEBS
Richard W. Smith, Racine, Wis., assignor to Pratt Manufacturing Corp., Milwaukee, Wis., a corporation of Wisconsin
Filed Aug. 7, 1968, Ser. No. 750,866
Int. Cl. B30b 15/34; B26c 1/56
U.S. Cl. 156—583
10 Claims

ABSTRACT OF THE DISCLOSURE

Packaging apparatus with means for continuously moving two superimposed continuous webs of packaging material, and including a heat sealing bar disposed transversely of the traveling web. There is mechanism for moving the heat sealing bar in an orbit to periodically engage the traveling web at longitudinally spaced points, and means automatically compensating for the change in speed of the sealing bar relative to the web due to the harmonic projection of the speed of the orbiting bar on a straight line, whereby said sealing bar, which engages the web for about 30 degrees on each side of center, is caused to travel at the same linear speed as the web during the entire period of engagement.

BACKGROUND OF THE INVENTION

Field of the invention

The invention pertains to continuous packaging apparatus by which articles are packaged between two webs of continuously moving material and sealed together along the outer edges and also crosswise at spaced intervals, the present invention relating particularly to the cross sealing procedure.

Description of the prior art

Packaging apparatus of the type with which the present invention is concerned is disclosed in Thompson Pat. No. 2,982,066, dated May 2, 1961. In this type of apparatus the transverse heat sealer is driven in an orbit, whereas the web is traveling in a straight line. There is a change in lineal speed of the sealer relative to the web due to the harmonic projection of its speed on a straight line as it travels in its orbit. With apparatus such as that disclosed in the Thompson patent, this creates a difference in speed on each side of the center with respect to the web. Actually, however, during sealing it is important to have the linear speed of the seal bar maintained approximately uniform and at the same speed as the speed of travel of the web during the entire period of engagement with the web, which is desirably about 30 degrees on each side of center. Otherwise there will be a difference between web speed and seal bar speed during sealing, and this detrimentally affects web tension. In actual practice, with orbital sealers as heretofore proposed, the paper surface speed is faster than the surface speed of the seal bar. This results in wrinkling or moving of the web with the possibility of web rupturing occurring.

SUMMARY OF THE INVENTION

The present invention provides, in packaging apparatus having an orbitally movable seal bar, novel means for compensating for the change in linear speed of the seal bar, as demonstrated by the harmonic projection of its speed on a straight line as it travels in its orbit, whereby the seal bar will be brought into engagement with the web and will be caused to travel at the same uniform speed as the web during said entire period of engagement for about 30° on each side of the center.

A more specific object of the invention is to provide, in a construction as above described, apparatus in which the seal bar is rigidly carried by the lower portion of a yoke, the yoke being movable in a vertical plane relative to a control bar, and the latter being pivoted intermediate the length of a pitman driven by spaced rotating discs. An arm which projects rigidly from the control bar has a cam follower on its outer end which is acted upon by a cam for causing a minor pivoting of the arm to automatically cause a change in linear speed of the sealing bar. This compensates for the difference between the projected speed of the seal bar on a straight line and the straight line speed of the web.

BRIEF DESCRIPTION OF THE DRAWINGS

In the drawings, illustrating one complete embodiment of a preferred form of the invention, in which the same reference numerals designate the same parts in all of the views:

FIG. 2 is an end elevational view looking at the right hand end of the mechanism of FIG. 1;

FIG. 3 is a fragmentary perspective view showing part of the apparatus of FIG. 1;

FIG. 4 is a diagrammatic view showing different progressive positions of the seal bar relative to a mark on the moving web to show how the straight line speed of movement of the seal bar is automatically correlated with the speed of movement of the web;

FIG. 5 is a diagram showing the relative positions of the paper and seal bar when using the features of the present invention;

FIG. 6 is a view similar to FIG. 5 showing the error between the speed of the seal bar and the speed of the paper when the features of the present invention are not employed; and FIG. 7 is a plan view of the web showing the seal patterns applied thereto, including the cross seal pattern of the present invention.

DESCRIPTION OF THE PREFERRED EMBODIMENT

Figure 1:
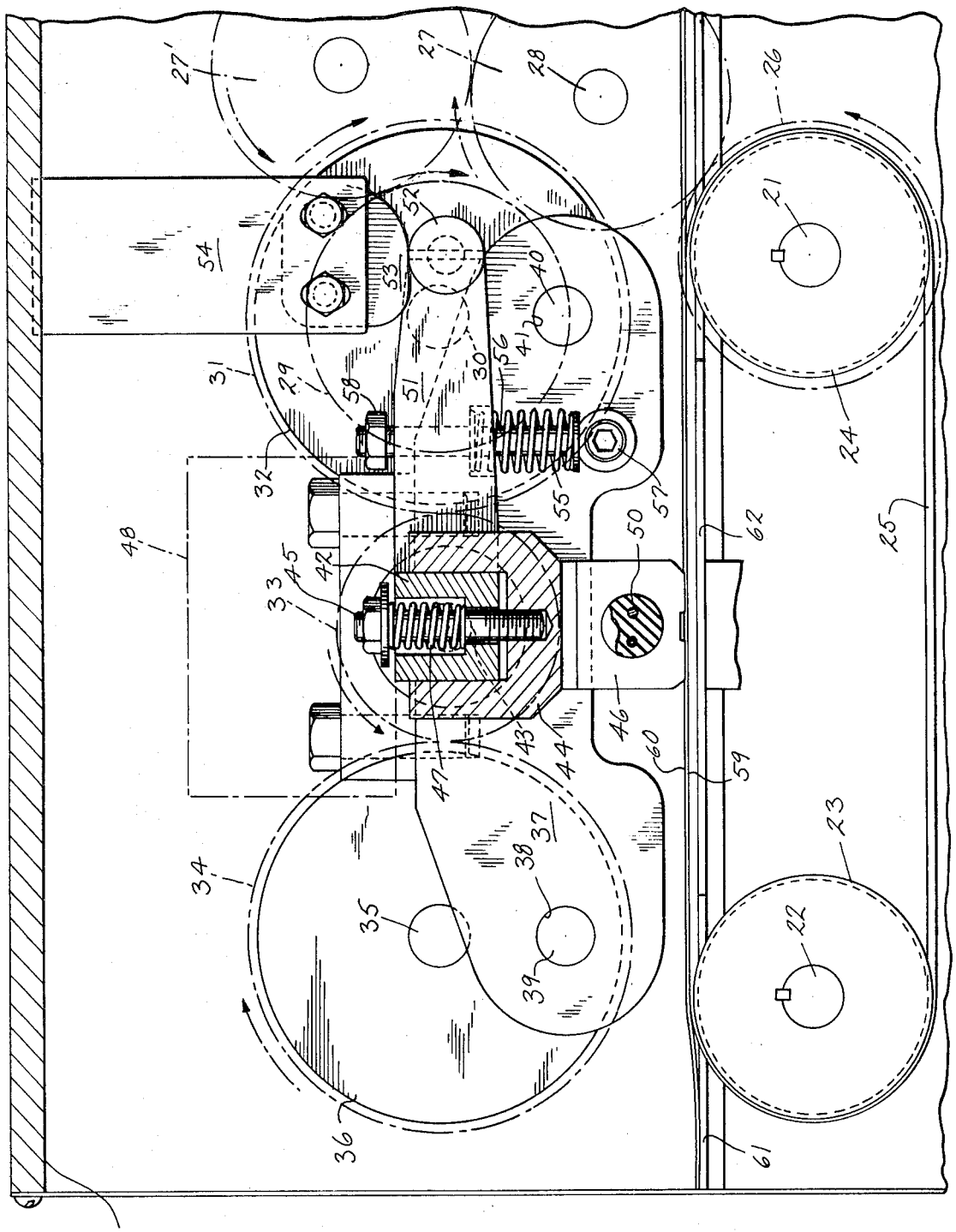
FIG. 1 is a view principally in side elevation showing the improved device, taken on the line 1—1 of FIG. 2, parts being broken away and shown in section.

Referring more particularly to the drawings, first to FIGS. 1, 2 and 3, the apparatus includes a suitable frame 20 in which shafts 21 and 22 are journalled, which shafts carry rollers 23 and 24 around which an endless belt 25 travels. Suitably mounted on one end of the shaft 21 is a gear 26 (see FIG. 2) which is driven by a gear 27 rigidly mounted on a drive shaft 28, the latter being suitably driven from any suitable source. The gear 27 also drives, through an intermediate gear 27', a gear 29 rigidly mounted on a shaft 30. Also mounted on the shaft 30 is a large gear 31 and a disc 32. The gear 31 meshes with an intermediate gear 33 which, in turn, drives another large gear 34 mounted rigidly on a shaft 35, which shaft drives another disc 36. A pitman 37 has a pinhole 38 at one end through which an eccentric pin 39 on the disc 36 rotatably extends. A similar pin 40 extends rotatably through a hole 41 at the opposite end of the pitman 37. Intermediate the length of the arm one end of a transverse control bar 42 is pivotally supported as at 43. Slidably connected with the control bar 42 so as to provide a lost motion connection is a yoke 44, there being bolts 45 extending slidably through the bar 42 and threaded into the yoke (see FIG. 1). Rigidly connected to the bottom of the yoke is a pressure element, which in the illustrated embodiment is seal bar 46, having suitable sealing projections thereon to produce a desired seal pattern such as that shown at 71 in FIG. 7. A spring 47 surrounding the bolt 45 normally urges the yoke and sealing element in an upward direction relative to the control bar 42 thereby tending to close the gap at the bottom of the control bar (see FIG. 1). Supported on top of the control bar is a pneumatic cup 48, there being a suitable conduit 49 for admitting compressed air from a suitable source. The function of the compressed air is to act on the piston 48' (FIG. 3) so that its stem 49', which is connected to the yoke, will normally urge the yoke and the pressure element 46 in a downward direction relative to the control bar 42 against the action of the spring 47.

Where the pressure element is a heat seal bar, there may be any suitable heating means, such as an electric heating element 50 in the bar 46.

Projecting from the control bar 42 in front of the pitman 37 is a cam arm 51 carrying a cam follower 52 on its outer end. The cam follower coacts with a cam member 53 projecting from the lower end of a support 54, the latter being rigidly carried by an upper portion of the frame. The cam arm operates against a spring 55 on a rod 56. One end of the rod is pivoted to the pitman 37 as at 57. The upper end of the rod extends slidably through the cam arm 51 and has an adjustment nut 58 on its upper end.

OPERATION

In operation, a continuous web of packaging material comprising a bottom layer 59 and a top layer 60 is continuously moved from suitable supply rolls over the table 61 and beneath the seal bar 46. The movement is caused by the endless conveyor belt 25. Below the upper stretch of the belt and beneath the heat seal 46 is a suitably supported backup plate 62. The speed of movement of the packaging material is constant and the drive for the orbital movement is correlated with the drive for the endless belt 25 because of the common drive wheel 27. Before the web material approaches the apparatus with which the present invention is concerned, longitudinal sealing along the sides as at 63 and 64 may be performed by any suitable means, articles to be packaged having been previously inserted between the two layers of the web as indicated at 65 in FIG. 7. While the preferred embodiment of the invention shows a common drive for the web and the orbital movement, it is also possible to use a synchronized drive.

Regardless of whether there is a common drive or a synchronized drive, because of the orbital movement of the seal bar 46 there would normally be a change in speed of the seal bar due to the harmonic projection of its speed on a straight line. This change in speed which would occur if it were not for the features of the present invention is illustrated in FIG. 6. In this figure the orbital movement is represented by the circle 66, and the zero degree reading indicates a position of the sealing bar 46 as it is about to start downwardly from the horizontal diameter line 67. The radial lines indicate various degrees of progress through a 180 degree travel. The line 68 is a straight line representing the web line to which the various harmonic projection lines (a) extend. The heavy portions of the lines (a), which are labled "seal bar positions," indicated lines perpendicular to the sealing face of the seal bar during its travel. Registration mark positions are shown on line 69. This has been vertically offset from the web line for purposes of clarity. The dots 70 designate various positions of a paper registration mark between packages as it approaches sealing position. As the paper travels, the change in speed of the sealer due to the harmonic projection makes no difference until contact takes place with the web. With the present invention this contact begins approximately at the 60 degree mark, or 30 degrees to the right of center C. The letter E designates the error between the lineal speed of the seal bar and the speed of the paper. Thus it will be seen that this error is substantial on both sides of the center, the paper surface speed being faster than the surface speed of the seal bar. Without the features of the present invention this error results in a wrinkling or moving of the web, with the possibility of rupture in certain materials. This is very undesirable.

With the present invention this error is corrected as shown in FIGS. 4 and 5 where it may be seen that, beginning with the 60° mark and extending through the 120° mark, the straight line speed of the seal bar and the paper are the same. This is brought about by the fact that as the seal bar moves downwardly from about the 60° position of FIGS. 5 and 6, the cam follower 52 moves downwardly on the surface of the cam member 53, being urged against the cam by the spring 55.

Prior to the cam follower 52 engaging the cam the arm 51 is urged by the spring 55 against the stop nut 58. This is adjusted so that prior to engagement of the follower 52 with the cam 53 the arm is urged by the spring 55 to a position tilted upwardly slightly in a counter-clockwise direction beyond horizontal, which results in tilting of the seal bar as indicated by the heavy portions of the lines (a) in FIG. 5. As the seal bar approaches the 60° position of FIG. 4 contact is made between the follower 52 and the came 53, and the shape of the cam 53 is such as to cause a downward or clockwise pivoting of the arm back toward horizontal. This slight tilting movement is progressive (as shown by the heavy portions of the lines (a) in FIG. 5, which portions are labeled "seal bar positions") and, in effect, acts to accelerate the lineal speed of the seal bar 46 so that the seal bar 46 is centered directly over the paper registration mark 70, as shown in FIG. 5. Thus at the 60°, 70°, 80° and 90° positions of FIGS. 4 and 5 the seal bar is centered over the registration mark 70 because its lineal speed has been corrected, beginning at approximately the 60° position so that it travels at the same lineal speed as the paper. At the 90° position the arm 51 is approximately horizontal and the heavy portion of the line (a) straight. While the bottom surface of the seal bar has been at a very slight angle away from the horizontal in the 60°, 70° and 80° positions, this has no practical effect on the sealing function because of the pressure exerted by the pneumatic cylinder on the seal bar. It is thus apparent that, with the above arrangement, when engagement actually starts to take place between the seal bar and the web, at approximately the 60° position of FIGS. 4 and 5, both the paper and the seal bar will travel at the same lineal speed.

The shape of the cam 53 is such that this same correlation of speed will be maintained throughout the period of engagement of the seal bar with the web, which engagement begins about 30° before center and continues through the 120° position of FIG. 4. Then the follower 52 starts to travel up the left hand side of the cam 53, allowing the spring 55 to thereafter urge the arm 51 in a counter-clockwise direction. This results in a reverse tilting of the seal bar, as indicated by the heavy portions of the lines (a) in FIG. 5 beginning at the 135° position, until the arm 51 again contacts the nut 58 of FIG. 1, it being noted that during the period when the follower 52 is being acted on by the cam 53 there is a small separation between the upper portion of the arm 51 and the nut 58.

During the above operation the air pressure from the air cylinder 48 urges the seal bar into pressure-sealing relationship with the traveling web, during the period of engagement from 60° to 120°, to effect the transverse seals 71 shown in FIG. 7, which seals must be definitely related to the registration marks 70. Thus there is no difference between the lineal speed of the web and the seal bar during sealing engagement, and the danger of wrinkling or moving of the web with possible rupture thereof is eliminated.

Thereafter the sealing bar travels up and over the cam member 53, in spaced relationship, so that it is not affected thereby until it again engages during a downward portion of the orbiting cycle.

While, for convenience of illustration and simplicity, the mechanism of FIG. 1 is shown as supporting the control bar 42 on one end only, which is satisfactory where short sealing elements are being supported, it is obvious that for longer sealing elements, suitable for making the seals 71 illustrated in FIG. 7, the control bar 42 will be supported on opposite ends, and the orbiting discs 32 and 36 of FIG. 1, together with the pitman 37, will be duplicated at the other end of the bar 42. It is also apparent that in lieu of the backup plate 62 and endless conveyor belt 25, the sealing bar supporting and orbiting mechanism of FIG. 1 may be duplicated and reversely positioned below a moving web so that two orbiting pressure bars act toward each other from opposite sides of the moving web.

While the preferred embodiment of the invention illustrates use of the invention in connection with transverse heat sealing it is obvious that the invention is applicable in various places where an orbiting pressure element engages a linearly traveling web, the exact function of the pressure element being unimportant as far as broad aspects of the invention are concerned; for example, the element could be a cold sealing element for effecting pressure sealing when heat is not required. In this case the heating element 50 will be omitted. The pressure element 46 may also be a pressure printing element which is adapted to print on a linearly traveling web.

Various other changes and modifications may be made without departing from the spirit of the invention, and all of such changes are contemplated as may come within the scope of the claims.

What I claim is:

1. In a pressure-applying device having drive means for linearly advancing web material to be transversely engaged at spaced intervals, a pressure element, driving means including continuously rotating means for continuously moving said element in an orbital path in the same orbital direction into and out of engagement with said advancing web material to be positively moved in the same direction therewith during part of its orbit, means correlating the drive for the advancing of said web and for said orbital movement, and means providing for prolonged engagement of the pressure element with the web material on each side of center, which means is independent of the action of the web and includes mechanism for automatically causing movement of the pressure element independent of its orbital movement to effect acceleration and deceleration of the linear speed of the pressure element at such time as to cause the pressure element to travel at the same linear speed as the web material during all of said period of prolonged engagement.

2. A pressure applying device as claimed in claim 1 in which the driving means includes a lost motion connection with the pressure element and includes means coacting with the lost motion connection which provides for the prolonged engagement.

3. A pressure applying device as claimed in claim 1 in which the means for automatically causing the pressure element to travel at the same linear speed as the web material includes cam mechanism including a cam arm rockably supporting said pressure element.

4. A pressure applying device as claimed in claim 2 in which there is a control bar pivotally connected to said driving means for rocking movement on the longitudinal axis of the control bar, and in which the pressure element is supported by said control bar for rocking movement therewith, said support for the pressure element including said lost motion connection between the pressure element and the control bar, and in which the means for automatically causing the pressure element to travel at the same linear speed as the web includes mechanism for rocking the control bar to thereby tilt the pressure element.

5. A pressure applying device as claimed in claim 1 in which the driving means for moving the pressure element in an orbital path includes a pitman on which the pressure element is supported, spaced rotating discs for driving said pitman, and means for driving said discs continuously in the same direction of rotation.

6. A pressure applying device as claimed in claim 5 in which there is a control bar with lost motion connection between the pressure element and control bar, the latter being pivotally connected to said pitman for rocking movement on the axis of the control bar, and said control bar having a projecting cam arm with a cam follower on its outer end, there being a fixed cam which is engaged by the follower during a portion of the orbital movement to cause rocking of the control bar on its axis and tilting of the pressure element to vary the linear speed at which the pressure element is positively moved by its driving means.

7. A pressure applying device as claimed in claim 6 in which there is a bolt pivotally connected at one end to the pitman and extending slideably through said cam arm, there being an adjustable stop nut on said bolt on one side of the cam arm and there being spring means surrounding the bolt on the other side of the cam arm normally urging the cam arm against said stop nut.

8. A pressure applying device as claimed in claim 6 in which the pressure element is connected to the under side of a yoke which has slideable engagement with the control bar.

9. A pressure applying device as claimed in claim 8 in which there is pressure applying means for urging the yoke and control bar apart to apply pressure to the web.

10. A pressure applying device as claimed in claim 8 in which there is spring means urging the yoke and control bar toward one another, and pressure applying means for urging them apart to apply pressure to the web.

References Cited

UNITED STATES PATENTS

| | | | |
|---|---|---|---|
| 2,467,879 | 4/1949 | Billeb | 156—553 |
| 3,195,286 | 6/1965 | Hubin | 156—583X |
| 3,290,202 | 12/1966 | Pratt | 156—583 |
| 3,431,827 | 3/1969 | Wahle et al. | 83—327X |

BENJAMIN A. BORCHELT, Primary Examiner

J. J. DEVITT, Assistant Examiner

U.S. Cl. X.R.

83—327; 156—504